United States Patent
Cherchi et al.

(10) Patent No.: US 9,985,328 B2
(45) Date of Patent: May 29, 2018

(54) MANAGEMENT OF THE OPERATION OF A SYSTEM FOR PRODUCING ELECTRIC POWER FROM HYDROGEN AND HYDROGEN FROM ELECTRIC POWER

(71) Applicants: Pierpaolo Cherchi, Turin (IT); Luca Baldini, Turin (IT); Simone Silvini, Turin (IT); Giuseppe Gianolio, Cellarengo (IT)

(72) Inventors: Pierpaolo Cherchi, Turin (IT); Luca Baldini, Turin (IT); Simone Silvini, Turin (IT); Giuseppe Gianolio, Cellarengo (IT)

(73) Assignee: ELECTRO POWER SYSTEMS S.P.A., Moncallieri (Turin) (IT)

( * ) Notice: Subject to any disclaimer, the term of this patent is extended or adjusted under 35 U.S.C. 154(b) by 450 days.

(21) Appl. No.: 14/603,558

(22) Filed: Jan. 23, 2015

(65) Prior Publication Data

US 2015/0129429 A1 May 14, 2015

Related U.S. Application Data

(63) Continuation-in-part of application No. 13/574,935, filed as application No. PCT/IB2011/000130 on Jan. 27, 2011, now abandoned.

(30) Foreign Application Priority Data

Jan. 28, 2010 (IT) .................. TO2010A000057

(51) Int. Cl.
*H01M 16/00* (2006.01)
*C25B 15/02* (2006.01)
(Continued)

(52) U.S. Cl.
CPC .......... *H01M 16/003* (2013.01); *C25B 15/02* (2013.01); *H01M 8/04753* (2013.01); *H01M 2008/1095* (2013.01)

(58) Field of Classification Search
CPC .......................... H01M 16/003; C25B 15/02
See application file for complete search history.

(56) References Cited

U.S. PATENT DOCUMENTS

| 7,537,683 B2 * | 5/2009 | Prerad | ................. | H01M 8/0656 204/237 |
| 2005/0178432 A1 * | 8/2005 | Porter | ...................... | F17C 7/00 137/14 |

(Continued)

*Primary Examiner* — Nicholas A Smith
(74) *Attorney, Agent, or Firm* — R. Ruschena Patent Agent, LLC

(57) ABSTRACT

A method for producing electric power from hydrogen and hydrogen from electric power, comprising:
  a reversible electric power-hydrogen conversion stage comprising a fuel cell stack to produce electric power from stored hydrogen and an electrolytic cell stack to produce hydrogen from electric power;
  a hydrogen pressure modification stage to modify the pressure of hydrogen supplied to or produced from the reversible electric power-hydrogen conversion stage;
  an electric power management and conditioning stage to condition electric power from/to the reversible electric power-hydrogen conversion stage; and
  a management stage to differentially manage the operation of the reversible electric power-hydrogen conversion stage, the hydrogen pressure modification stage and the electric power management and conditioning stage according to whether the system produces electric power from hydrogen or hydrogen from electric power and on a user-settable operation management strategy.

4 Claims, 2 Drawing Sheets

(51) Int. Cl.
*H01M 8/04* (2016.01)
*H01M 8/04746* (2016.01)
*H01M 8/1018* (2016.01)

(56) References Cited

U.S. PATENT DOCUMENTS

2009/0263681 A1* 10/2009 Atreya .................. C25B 1/04
  429/418
2013/0175798 A1* 7/2013 Devine .................. F17C 3/025
  290/44

* cited by examiner

MANAGEMENT OF THE OPERATION OF A SYSTEM FOR PRODUCING ELECTRIC POWER FROM HYDROGEN AND HYDROGEN FROM ELECTRIC POWER

RELATED APPLICATIONS

This application is a CIP of application Ser. No. 13/574,935, filed Jul. 24, 2012, which is the U.S. national phase of International Application No. PCT/IB2011/000130, filed Jan. 27, 2011, which claims the benefit to Italian Patent Application No. TO2010A000057, filed Jan. 28, 2010.

TECHNICAL FIELD OF THE INVENTION

The present invention relates to a method for managing a system for producing electric power from hydrogen by means of fuel cells (electric generator) and hydrogen from electric power by means of electrolytic cells (electrolyzer).

STATE OF THE ART

It is known that fuel cells are one of the most promising solutions from the technological point of view for using hydrogen as energy carrier. They are devices which, by taking advantage from an electrochemical reaction, may convert chemical power into electric power. Two half reactions simultaneously occur in a single fuel cell on the anode and cathode, respectively. Anode and cathode of a fuel cell are separated by an electrolyte, typically consisting of a proton-conducting sulphonate polymer, the opposite sides of which are coated with an appropriate layer of catalytic mixture (e.g. Pt-based). The electrolyte is generally saturated with a ionic carrier fluid (e.g. water) so that the hydrogen ions may cross it from anode to cathode.

The overall reaction which occurs in a fuel cell is:

$$2H_2 + O_2 \rightarrow 2H_2O \quad (1)$$

which is accompanied by the development of heat and electric power and derives from the sum of the two half reactions occurring at the anode and cathode, respectively:

$$2H_2 \rightarrow 4H^+ + 4e^- \quad (2)$$

$$O_2 + 4H^+ + 4e^- \rightarrow 2H_2O \quad (3).$$

Hydrogen is then fed to the anode and diffuses into the catalytic coating and disassociates into hydrogen ions and electrons which, as the membrane is impermeable thereto, travel through an external electric circuit towards the cathode, thus generating an electric current and the corresponding potential difference. A gas mixture containing oxygen is fed to the cathode instead, which reacts with the hydrogen ions which have crossed the electrolyte and the electrons from the external electric circuit.

The reactant gases need to be humidified because the protons passing through the polymeric membrane specifically occurs by virtue of the water molecules: a too low humidity degree causes a greater passing difficulty for protons from the anode compartment to the cathode compartment, with a consequent decrease of the fuel cell performance, while a too high humidity degree condenses into liquid state, with a consequent occlusion of the catalytic sites and decrease of the fuel cell performance.

As the reaction (1) is associated with the generation of a well-defined, maximum electric voltage, multiple fuel cells are generally connected in series so as to form a stack in order to reach a higher voltage.

In a type of systems for producing electric power from hydrogen by means of fuel cells, the hydrogen required to operate the system is stored in cylinders, which should be necessarily periodically replaced to reintegrate the hydrogen used.

In order to obviate this drawback, a different type of systems for producing electric power from hydrogen uses regenerating or reversible fuel cells, which are inversely operated to produce hydrogen from the produced electric power.

Again to obviate this drawback, systems for producing electric power from hydrogen by means of fuel cells and hydrogen from electric power by means of electrolytic cells have also been suggested, in which an electrolyzer based on electrolytic cells is arranged by the side of an electric generator based on fuel cells to reintegrate the hydrogen consumed by the latter. In these production systems, however, there is no integrated strategy for managing the operation of the systems from producing hydrogen and generating electric power on which the user may intervene also in relation to instantaneous local conditions.

OBJECT AND SUMMARY OF THE INVENTION

Therefore, it is the object of the present invention to provide a system for producing electric power from hydrogen by means of fuel cells and hydrogen from electric power by means of electrolytic cells, which overcomes the described drawbacks.

According to the present invention, a system and a method for producing electric power from hydrogen by means of fuel cells and hydrogen from electric power by means of electrolytic cells is provided as defined in the appended claims.

DETAILED DESCRIPTION OF PREFERRED EMBODIMENTS OF THE INVENTION

The present invention will now be described in detail with reference to the accompanying figures to allow a person skilled in the art to implement it and use it. Various changes to the described embodiments will be immediately apparent to people skilled in the art, and the general principles described may be applied to other embodiments and applications without therefore departing from the scope of protection of the present invention, as defined in the appended claims.

Therefore, the present invention should not be considered as limited to the described and illustrated embodiments but instead confers the broadest scope of protection, in accordance with the principles and features described and claimed herein.

Figure 1:
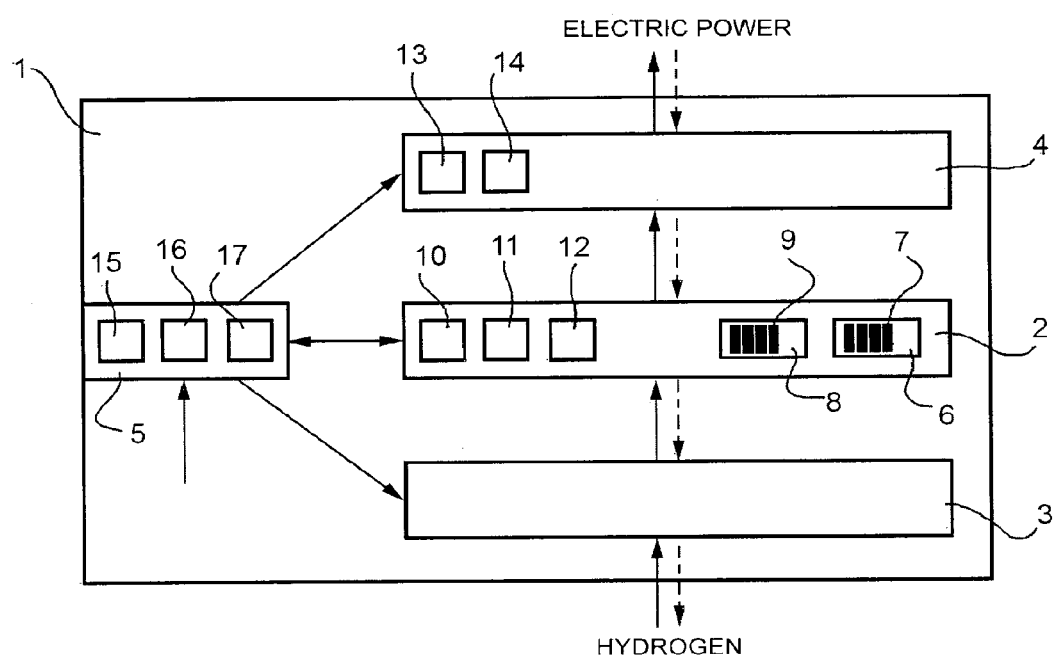
FIG. 1 shows a block diagram of a system for producing electric power from hydrogen by means of fuel cells and hydrogen from electric power by means of electrolytic cells.

In FIG. 1, numeral 1 indicates as a whole a system for producing electric power from hydrogen by means of fuel cells and hydrogen from electric power by means of electrolytic cells, which may be selectively operated to produce electric power from hydrogen and to supply it to an electric user or local electric supply network, and to take electric power from a local electric supply network and to produce hydrogen therefrom. In FIG. 1, the hydrogen and electric power flows in the production system 1 when producing electric power from hydrogen and when producing hydrogen from electric power are shown by a solid line and a dashed line, respectively.

The production system 1, which implies a production method, of which only the parts required for understanding the present invention are shown, essentially comprises:
- a reversible electric power-hydrogen conversion stage 2;
- a hydrogen pressure modification stage 3;
- an electric power management and conditioning stage 4; and
- a management stage 5 configured to manage the operation of the reversible electric power-hydrogen conversion stage 2, of the hydrogen pressure modification stage 3 and of the electric power management and conditioning stage 4 according to the modes described below.

The reversible electric power-hydrogen conversion stage 2 may be selectively operated in a mode of producing electric power from hydrogen and in a mode of producing hydrogen from electric power, and essentially comprises:
- a electric generator 6 which may be operated to produce electric power from hydrogen and comprises a fuel cell stack 7 for generating electric power, and formed by a plurality of stacked Proton Exchange Membrane (PEM) fuel cells electrically connected in series; and
- an electrolyzer 8 coupled to the electric generator 6 and operable to produce hydrogen from electric power and comprising a stack of electrolytic cells 9 to produce hydrogen from the electric power generated by the electric generator 6.

Each fuel cell essentially comprises a membrane-electrode assembly (MEA) and two bipolar plates, which are assembled by means of secondary components, such as seals, headers, springs or closing tie-rods. The membrane-electrode assembly is dedicated to the cleavage of the hydrogen atom into proton and electron, and has an operating temperature of about 70° C. and a relative humidification of 70.5% @ 70° C. The two bipolar plates optimally operate in the presence of mono-base fluids and instead serve the function of carrying reactants (air or oxygen, hydrogen) towards the membrane-electrode assembly and to act as electric current collectors.

Figure 2:
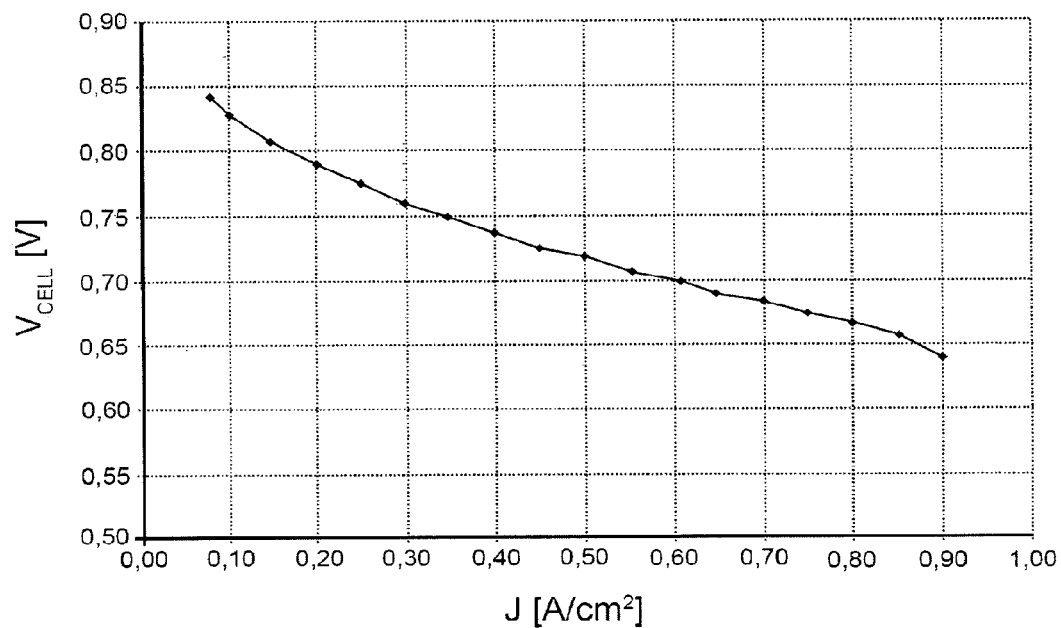
FIG. 2 shows the electric voltage pattern in a single fuel cell as a function of the current density.

The electric voltage of a single fuel cell depends on the electric power required from the fuel cell itself and follows the pattern shown in FIG. 2, in which the average electric voltage $V_{CELL}$ $V_{CELL}$ of a fuel cell measured at 60° C. is shown on the ordinate axis, while the electric current density J required from the fuel cell itself is shown on the abscissa axis.

By virtue of the electric connection in series of the fuel cells, the electric power supplied by the fuel cell stack 7 is simply the sum of electric voltages supplied by the single fuel cells and has a pattern similar to that shown in FIG. 2. The uniformity in distributing the electric voltage supplied by the single fuel cells is a key parameter for the performance and durability of the membrane-electrode assemblies.

Figure 3:
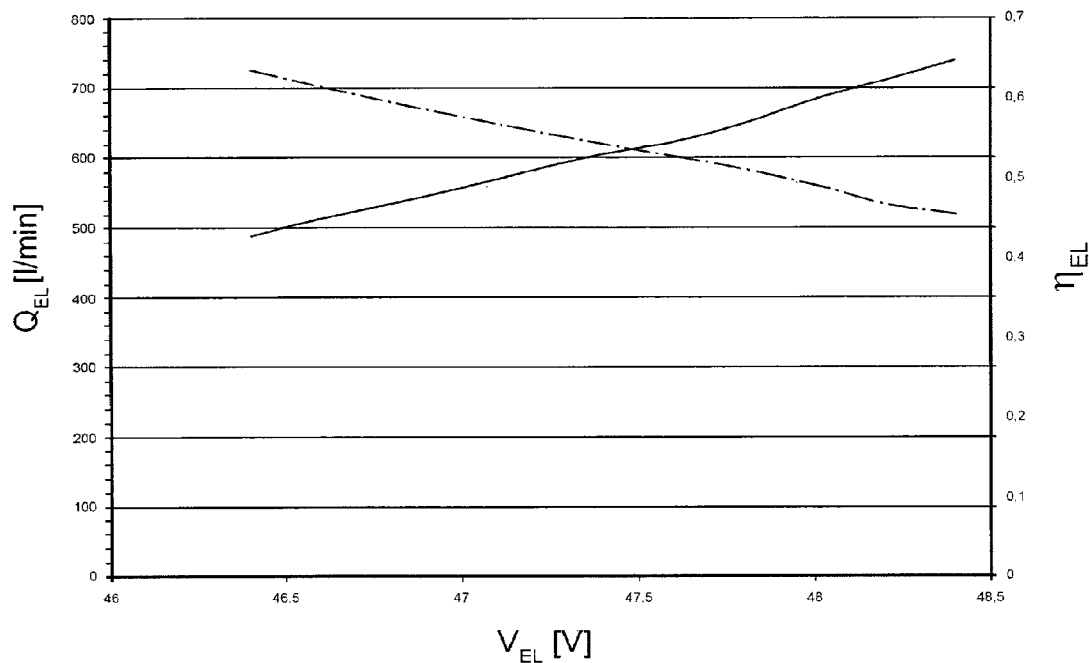
FIG. 3 shows the pattern of the produced hydrogen flow rate and the pattern of the hydrogen production efficiency of an electrolyzer according to the electric voltage applied to the electrolyzer itself.
Figure 4:
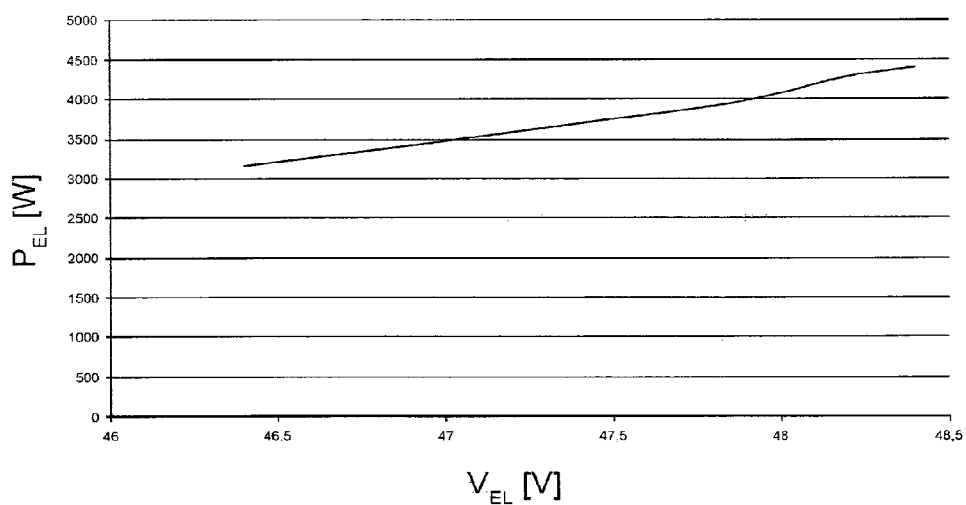
FIG. 4 shows the pattern of the electric power applied to an electrolyzer according to the electric voltage applied to the electrolyzer itself.

In the electrolytic cell stack 9, instead, the flow rate of produced hydrogen $Q_{EL}$ and the hydrogen production efficiency $\eta_{EL}$ depend on the electric voltage $V_{EL}$ applied to the electrolytic cell stack 9 and follow the patterns shown in FIG. 3 by a solid line and a dashed-and-dotted line, respectively, while the electric power $P_{EL}$ applied to the electrolytic cell stack 9 is directly proportional to the electric voltage V applied to the electrolytic cell stack 9 itself and follows the pattern shown in FIG. 4.

The patterns of the produced hydrogen flow rate $Q_{EL}$, of the hydrogen production efficiency $\eta_{EL}$ and of the electric power $P_{EL}$ depend on the temperature at which the electrolytic cell stack 9 operates, and those shown in FIGS. 3 and 4 relate to 60° C. The working voltage value limits are related to the number of electrolytic cells in the electrolytic cell stack 9, to the reaction activation energy (minimum value) and to the limit voltage tolerated by the electrolytic cell stack 9 (maximum value). The hydrogen flow rate $Q_{EL}$ produced by a single electrolytic cell instead depends on the active area of the electrolytic cell itself.

The reversible electric power-hydrogen conversion stage 2 further comprises:
- a thermal management unit 10 in common to the electric generator 6 and the electrolyzer 8;
- a measurement unit 11 for measuring electric quantities of the electric generator 6 and of the electrolyzer 8, such as temperature, electric voltage of a single fuel cell, electric current delivered by the fuel cell stack 7, equivalent impedance of the fuel cell stack 7 etc.; and
- a flow management unit 12 for managing the distribution of flows of electric power and hydrogen, and the humidification conditions of the membranes of the fuel cells, which are not described in greater detail because they are known per se and however not involved in the present invention.

The hydrogen pressure modification stage 3 performs the function of modifying, in particular either increasing or decreasing, the pressure of hydrogen supplied to or produced by the reversible electric power-hydrogen conversion stage 2, according to whether the latter operates in a mode of producing electric power from hydrogen or in a mode of producing hydrogen from electric power, and essentially consists of passive components, such as expansion vessels, membrane reduction stages, plenum, and active components such as boosters, connected to one another.

In other words, in the context of the present invention, the hydrogen pressure modification stage 3 essentially consists of components such as to determine the desired increase—or the desired reduction—of the hydrogen pressure inputted by means of an interaction of essentially mechanical nature.

The electric power management and conditioning stage 4 performs the function of conditioning the electric power to and from the reversible electric power-hydrogen conversion stage 2, in particular from the reversible electric power-hydrogen conversion stage 2 to the electric user or local electric supply network, when it operates in a mode of producing electric power from hydrogen, and from local electric supply network to the reversible electric power-hydrogen conversion stage 2, when it operates in a mode of producing hydrogen from electric power.

In particular, the electric power management and conditioning stage 4 essentially comprises:
- an optional DC/DC conversion unit 13; and
- a AC/DC conversion unit 14 adapted to operate as an ideal current or voltage generator, so as to force the output voltage or current regardless of the input values within design value limits.

In particular, the AC/DC conversion unit 14 consists of static, electric power conversion elements, such as semiconductor devices (diodes, MOSFETs), inductive and capacitive reactances connected according to a boost- or buck-type topology, i.e. capable of converting the electric power by varying voltage and electric currents thereof, either value independently, the other as a consequence of the required electric power. Such a task may also be performed by managing a bridge unit (batteries or super-capacitors).

The management stage 5 essentially comprises:
- a digital and analog input/output unit 15 for acquiring the electric measurements supplied by the measurement unit 11 and inputting data, commands and selections by a user;
- a communication unit 16 for communicating with a remote control station; and
- a microcontroller (DSP) 17 connected to the digital and analog input/output unit 15 and to the communication unit 16, and programmed for acquiring the electric measurements supplied by the measurement unit 11, the data, commands and selections imparted by a user and possible requests provided by the remote control station, for storing a map containing produced hydrogen data $Q_{EL}$ and hydrogen production efficiency $\eta_{EL}$ data for various temperature values of the electrolytic cell stack 9, and managing the operation of the reversible electric power-hydrogen conversion stage 2, of the hydrogen pressure modification stage 3, and of the electric power management and conditioning stage 4 according to whether the system 1 produces electric power from hydrogen or hydrogen from electric power, according to an operation management strategy described in detail below.

1. Production of Electric Power From Hydrogen

During the production of electric power from hydrogen, microcontroller 17 operates by:
- causing the hydrogen pressure modification stage 3 to reduce the hydrogen pressure from the storage pressure, generally equal to about 100-300 bar, to the use pressure, generally equal to 2-8 bar, to ensure the stability thereof;
- causing the reversible electric power-hydrogen conversion stage 2 to convert hydrogen into electric power;
- causing the electric power management and conditioning stage 4 to manage the reversible electric power-hydrogen conversion stage 2 by imposing voltage and current values thereof according to preset logics which take account of voltage and current transients acceptable by the reversible electric power-hydrogen conversion stage 2, so that the latter supplies electric power in the form required by an electric user or a local electric power supply network to which the produced electric power is to be supplied (constant voltage, ideal voltage generator, ideal current generator, battery charger, etc.); and
- causing the communication unit 19 to communicate the activation of system 1 and residual autonomy thereof to the remote control station.

2. Production of Hydrogen From Electric Power

During the production of hydrogen from electric power, microcontroller 17 operates by:
- determining when system 1 is to be activated according to the following information:
  - presence and available quantity of electric power in situ (local electric supply network, renewable local sources, motor-generator, etc.);
  - stored hydrogen amount; and
  - requests by the remote control station; and
- managing the operation of the reversible electric power-hydrogen conversion stage 2, of the hydrogen pressure modification stage 3, and of the electric power management and conditioning stage 4 according to an operation management strategy that:
  - is settable by a user of system 1;
  - depends on the following electric quantities measured by the measurement unit 11 in system 1;
  - stored hydrogen amount;
  - available amount of electric power; and
  - local ambient temperature and pressure;
  and aiming at achieving, according to applications, one or more of the following objectives, also by managing the hydrogen pressure modification stage 3:
  - filling the hydrogen storage in the shortest possible time;
  - filling the hydrogen storage with the highest possible efficiency;
  - filling the hydrogen storage using all of the available electric power (residual electric power negotiated with the electric power supplier or electric power deriving from a renewable source and possible pattern over time); and
  - ensuring the filling of the hydrogen storage according to the programmed electric power cut-offs in the local electric power supply network.

In particular, according to the operation management strategy and process and thus to the objectives that the user wants to achieve, the electric power management and conditioning unit 4 differently acts on the reversible electric power-hydrogen conversion stage 2 by setting electric currents and voltages which are used to supply the electrolytic cell stack 9 and are dynamically calculated by the microcontroller 17 according to the set operation management strategy, to the values of the aforesaid electric quantities measured by the measurement unit 11 in system 1, and to the curve shown in FIG. 3.

More in detail:
- in order to fill the hydrogen storage in the shortest possible time, the electric power management and conditioning stage 4 forces the reversible electric power-hydrogen conversion stage 2 to operate at the maximum possible electric voltage which may be supported by the electrolytic cell stack 9 at the reference temperature to have the highest produced hydrogen flow rate $Q_{EL}$ (in FIG. 3 equal to 48.5 V @ 60° C.);
- in order to fill the hydrogen storage with the highest possible efficiency, the electric power management and conditioning stage 4 forces the reversible electric power-hydrogen conversion stage 2 to operate at the minimum admissible electric voltage, i.e. at the voltage under which gases do not separate, thus ensuring the required purity (in FIG. 3 equal to 46.5 V);
- in order to fill the hydrogen storage using all of the available electric power, microcontroller 17 firstly calculates the maximum hydrogen flow rate producible with the available electric power and supplies this data to the electric power management and conditioning unit 4 which will thus cause the reversible electric power-hydrogen conversion stage 2 to produce the maximum calculated hydrogen flow rate. The higher the available electric power, the higher the electric voltage imposed to the electrolytic cell stack 9;
- in order to ensure the filling of the hydrogen storage according to the programmed electric power cut-offs in the local electric power supply network, microcontroller 17 firstly calculates the available electric power.

The calculation is carried out according to the available electric power and to the remaining time before the programmed cut-off (power integral over the available time). Afterwards, the microcontroller 17 calculates the average working point (voltage and current of the reversible electric power-hydrogen conversion stage 2). The average working point is then supplied to the electric power management and conditioning stage 4, which causes the reversible electric power-hydrogen conversion stage 2 to work in this point.

The advantages allowed by the system as compared to the currently existing, available solutions are apparent from an examination of the features of the system according to the present invention.

In particular, as compared to solutions having a storage based on replacing hydrogen cylinders, the system according to the present invention is more reliable and most cost-effective to be implemented.

As compared to solutions based on coupling an electric fuel cell generator and an electrolyzer, the system according to the present invention has:

lower costs due to the use of common parts;
more efficiency due to the possibility of implementing evolved, integrated strategies; and
more efficiency due to the management of hydrogen production parameters in relation to the surrounding conditions.

Finally, as compared to the solutions based on reversible fuel cells, the system according to the present invention is:

more reliable due to the higher maturity of the technology and to the possibility of performing interventions (ordinary and supplementary maintenance) in a separate and independent manner on the fuel cell stack and on the electrolytic cell stack; and
more efficient due to the possibility of independently designing the hydrogen production and use stages.

The invention claimed is:

1. A method for producing electric power from hydrogen and hydrogen from electric power, wherein said method is implemented using a system (1) comprising:

a reversible electric power-hydrogen conversion stage (2) comprising a fuel cell stack (7) producing electric power from stored hydrogen and an electrolytic cell stack (9) producing hydrogen from electric power;
a hydrogen pressure modification stage (3) modifying pressure of hydrogen from/to the reversible electric power-hydrogen conversion stage (2);
an electric power management and conditioning stage (4) conditioning electric power from/to the reversible electric power-hydrogen conversion stage (2); and
a management stage (5) differentially managing operation of the reversible electric power-hydrogen conversion stage (2), the hydrogen pressure modification stage (3) and the electric power management and conditioning stage (4) based on whether the system (1) is operated to produce electric power from hydrogen or hydrogen from electric power and on a user-settable operation management strategy;

wherein said method, when operated to produce hydrogen from electric power, the management stage (5) provides the operations of:

determining, by way of a microcontroller (17), when the system (1) is to be activated based on the following:
availability and presence of electric power in situ; stored hydrogen amount; and requests by a remote control station;
causing the reversible electric power-hydrogen conversion stage (2) to convert electric power to hydrogen;
causing the electric power management and conditioning stage (4) to control the reversible electric power-hydrogen conversion stage (2) based on a user-settable control strategy to achieve one or more of all the following targets:

a) filling the hydrogen storage in the shortest possible time, forcing the reversible electric power-hydrogen conversion stage (2) to operate at the maximum possible voltage supported by the electrolytic cell stack (9) to have the highest hydrogen flow rate at a given reference temperature;
b) filling the hydrogen storage with the highest possible efficiency, forcing the reversible electric power-hydrogen conversion stage (2) to operate at the minimum admissible electric voltage under which gases do not separate, ensuring purity;
c) filling the hydrogen storage, causing the reversible electric power-hydrogen conversion (stage 2) to operate in an operation point corresponding to the maximum hydrogen flow rate achievable with the available electric power; and
d) ensuring the filling of the hydrogen storage using all available electric power, taking account of the programmed electric power cut-offs in the local electric power supply network, causing the reversible electric power-hydrogen conversion stage (2) to operate in an operation point determined as the average of operation points computed integrally based on the available electric power and the available time.

2. The method according to claim 1, wherein, when operated to produce electric power from hydrogen, the management stage (5) is configured to:

causinq the hydrogen pressure modification stage (3) to reduce stored hydrogen pressure from a storage pressure of between 100 and 300 bar to a use pressure of between 2 and 8 bar;
causing the reversible electric power-hydrogen conversion stage (2) to convert the stored hydrogen into electric power;
causing the electric power management and conditioning stage (4) to manage the reversible electric power-hydrogen conversion stage (2) by imposing voltage and current values thereof according to preset logics which take account of voltage and current transients acceptable by the reversible electric power-hydrogen conversion stage (2), whereby the latter supplies electric power in the form requested by an electric load or a local electric power supply network to which the produced electric power is to be supplied.

3. The method according to claim 1, wherein, when operated to produce electric power from hydrogen, the management stage (5) is further configured to: causing a communication unit (16) to communicate system activation and residual autonomy thereof to a remote control station.

4. The method according to claim 1, wherein the management stage (5) is configured to dynamically compute electric voltage and current values to be supplied to the electrolytic cell stack (9) based on the user-settable control strategy and electric quantities measured by a measurement unit (11) in the system (1).

* * * * *